(12) United States Patent
Rendahl et al.

(10) Patent No.: US 6,561,027 B2
(45) Date of Patent: May 13, 2003

(54) SUPPORT STRUCTURE FOR SYSTEM FOR MEASURING VEHICLE SPEED AND/OR ACCELERATION

(75) Inventors: Craig S. Rendahl, Tucson, AZ (US);
John DiDomenico, Tucson, AZ (US);
Paul F. Kyle, Tucson, AZ (US);
George T. Hovancik, Tucson, AZ (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 09/846,247

(22) Filed: May 2, 2001

(65) Prior Publication Data

US 2002/0083770 A1 Jul. 4, 2002

Related U.S. Application Data

(60) Provisional application No. 60/258,561, filed on Dec. 29, 2000.

(51) Int. Cl.[7] .................................................. G01P 1/02
(52) U.S. Cl. ........................................................ 73/493
(58) Field of Search .................. 73/488, 493; 340/669, 340/670; 342/104, 105, 106; 356/27, 28

(56) References Cited

U.S. PATENT DOCUMENTS

| | | | |
|---|---|---|---|
| 3,696,247 A | 10/1972 | McIntosh et al. | 250/83.3 H |
| 3,811,776 A | 5/1974 | Blau, Jr. | 356/51 |
| 3,957,372 A | 5/1976 | Jowett et al. | 356/51 |
| 3,958,122 A | 5/1976 | Jowett et al. | 250/346 |
| 3,973,848 A | 8/1976 | Jowett et al. | 356/51 |
| 4,012,144 A | 3/1977 | Hedelman | 356/73 |
| 4,013,260 A | 3/1977 | McClatchie et al. | 250/343 |
| 4,160,373 A | 7/1979 | Fastaia et al. | 73/23 |
| 4,171,909 A | 10/1979 | Kramer et al. | 356/73 |
| 4,204,768 A | 5/1980 | N'guyen | 356/243 |
| 4,310,249 A | 1/1982 | Kramer | 356/414 |
| 4,348,732 A | 9/1982 | Kreft | 364/571 |

(List continued on next page.)

OTHER PUBLICATIONS

Radian Corp.; "Developing and Inspection/Maintenance Program for Alternatively–Fueled Vehicles"; 1993.

Islam, Muhammed, Rendahl, Craig S., CORS, Rebecca; "Wisconsin's Remove Vehicle Emissions Sensing Study"; Final Report 1995.

Walsh, P.A., Gertler, A.W., "Texas 1996 Remote Sensing Feasibility Study"; Final Report 1997.

Popp, Peter J.; "Development of a High–Speed Ultraviolet Spectrophotometer Capable of Real–Time NO and Aromatic Hydrocarbon Detection in Vehicle Exhaust"; pp. 4–3 & 4–12;Coordinating Research Council 1997.

McVey, Iain Frederich; "Development of a Remote Sensor for Mobile Source Nitric Oxide"; University of Denver 1992.

Beaton, S.P., Bishop, G.A. and Stedman D.H.; Emissions Characteristics of Mexico City Vehicles; pp. 42, 1424–1429; Journal of Air and Waste Management Assoc. 1992.

Zhang, Yi, Stedman, Donald H., Bishop, Gary A., Beaton, Stuart P., Guenther, Paul L. and McVey, Iain F.; "Enhancement of Remote Sensing for Mobile Source Nitric Oxide"; Journal of Air & Waste Mangement 1996; vol. 46, pp. 25–29.

Popp, Peter John; "Remote Sensing of Nitric Oxide Emissions from Planes, Trains and Automobiles"; University of Denver 1999.

Zhang, Yi, Stedman, Donald H., Bishop, Gary A., Beaton, Stuart P., and Guenther, Paul L.; "Worldwide On–Road Vehicle Exhaust Emissions Study by Remote Sensing"; Environmental Science & Technology 1995; vol. 29#9. pp. 2286–2294.

(List continued on next page.)

*Primary Examiner*—Richard A. Moller
(74) *Attorney, Agent, or Firm*—Baker & Hostetler, LLP

(57) ABSTRACT

A support for supporting two or more units used in a system for measuring a speed and or acceleration of a vehicle, with the support able to rest on a surface, has an elongated bar on which the units are mounted. A first leg and a second leg are both mounted to the bar. A third leg is mounted to a rear portion of the bar. The legs are height-adjustable.

20 Claims, 2 Drawing Sheets

U.S. PATENT DOCUMENTS

| | | | |
|---|---|---|---|
| 4,372,155 A | 2/1983 | Butler et al. .................. | 73/114 |
| 4,390,785 A | 6/1983 | Faulhaber et al. .......... | 250/330 |
| 4,432,316 A | 2/1984 | Ogita .......................... | 123/328 |
| 4,490,845 A | 12/1984 | Steinbruegge et al. ......... | 382/1 |
| 4,560,873 A | 12/1985 | McGowan et al. ......... | 250/339 |
| 4,602,160 A | 7/1986 | MacTaggart ................ | 250/341 |
| 4,632,563 A | 12/1986 | Lord, III .................... | 356/437 |
| 4,638,345 A | 1/1987 | Elabd et al. .................. | 357/24 |
| 4,663,522 A | 5/1987 | Welbourn et al. ....... | 250/223 R |
| 4,678,914 A | 7/1987 | Melrose et al. ............. | 250/343 |
| 4,687,934 A | 8/1987 | Passaro et al. ............. | 250/343 |
| 4,710,630 A | 12/1987 | Kuppenheimer et al. ... | 250/353 |
| 4,746,218 A | 5/1988 | Lord, III .................... | 356/437 |
| 4,795,253 A | 1/1989 | Sandridge et al. ............ | 356/437 |
| 4,818,705 A | 4/1989 | Schneider et al. .......... | 436/164 |
| 4,829,183 A | 5/1989 | McClatchie et al. ........ | 250/346 |
| 4,868,622 A | 9/1989 | Shigenaka ................... | 357/30 |
| 4,875,084 A | 10/1989 | Tohyama ..................... | 357/30 |
| 4,914,719 A | 4/1990 | Conlon et al. .............. | 250/339 |
| 4,924,095 A | 5/1990 | Swanson, Jr. ............ | 250/338.5 |
| 4,963,023 A | 10/1990 | Goldovsky et al. ......... | 356/308 |
| 4,999,498 A | 3/1991 | Hunt et al. ............... | 250/338.5 |
| 5,002,391 A | 3/1991 | Wolfrum et al. ............. | 356/307 |
| 5,041,723 A | 8/1991 | Ishida et al. ................ | 250/339 |
| 5,061,854 A | 10/1991 | Kroutil et al. .............. | 250/339 |
| 5,076,699 A | 12/1991 | Ryan et al. .................. | 356/437 |
| 5,157,288 A | 10/1992 | Hill ........................... | 307/511 |
| 5,185,648 A | 2/1993 | Baker et al. ................ | 257/189 |
| 5,210,702 A | 5/1993 | Bishop et al. .............. | 364/496 |
| 5,239,860 A | 8/1993 | Harris et al. ............... | 73/61.48 |
| 5,252,828 A | 10/1993 | Kert et al. ................... | 250/339 |
| 5,255,511 A | 10/1993 | Maus et al. .................... | 60/274 |
| 5,307,626 A | 5/1994 | Maus et al. .................... | 60/274 |
| 5,319,199 A | 6/1994 | Stedman et al. ......... | 250/338.5 |
| 5,332,901 A | 7/1994 | Eckles et al. ............... | 250/345 |
| 5,343,043 A | 8/1994 | Johnson .................... | 250/338.5 |
| 5,361,171 A | 11/1994 | Bleier ........................ | 359/855 |
| 5,371,367 A | 12/1994 | DiDomenico et al. ... | 250/338.5 |
| 5,373,160 A | 12/1994 | Taylor ...................... | 250/338.5 |
| 5,401,967 A | 3/1995 | Stedman et al. ......... | 250/338.5 |
| 5,418,366 A | 5/1995 | Rubin et al. ............. | 250/338.5 |
| 5,489,777 A | 2/1996 | Stedman et al. ......... | 250/338.5 |
| 5,498,872 A | 3/1996 | Stedman et al. ......... | 250/338.5 |
| 5,545,897 A | 8/1996 | Jack ...................... | 250/339.13 |
| 5,583,765 A | 12/1996 | Kleehammer ........ | 364/423.098 |
| 5,591,975 A | 1/1997 | Jack et al. ................ | 250/338.5 |
| 5,621,166 A | 4/1997 | Butler ......................... | 73/116 |
| 5,644,133 A | 7/1997 | DiDomenico et al. ... | 250/338.5 |
| 5,719,396 A | 2/1998 | Jack et al. ................ | 250/338.5 |
| 5,726,450 A | 3/1998 | Peterson et al. ......... | 250/338.5 |
| 5,797,682 A | 8/1998 | Kert et al. ................... | 374/123 |
| 5,812,249 A * | 9/1998 | Johnson et al. ............... | 356/28 |
| 5,831,267 A | 11/1998 | Jack et al. ................ | 250/338.5 |
| 5,922,948 A | 7/1999 | Lesko et al. ............... | 73/117.3 |
| 6,057,923 A | 5/2000 | Sachse ....................... | 356/364 |
| 6,230,087 B1 | 5/2001 | DiDomenico et al. ........ | 701/29 |
| 6,307,201 B1 | 10/2001 | DiDomenico et al. . | 250/339.13 |

OTHER PUBLICATIONS

Glover, Edward L., Mickelsen, Jan and McClement Dennis; Evaluation of Methods to Determine Catalyst Efficiency in the Inspection/Maintenance Process; Society of Automotive Engineers; SAE#9600092.

Butler, James, Gierczak, Christine and Liscombe Paula; "Factors Affecting the NDIR Measurement of Exhaust Hydrocarbons"; Coordinating Research Council 1995; pp. 4–171 & 4–190.

MacKay, Gervase I., Nadler, S. Don, Karecki, David R., Schiff, Harold I., Butler, James W., Gierczak, Christine A. and Jesion, Gerald; "Final Phase 1b Report to the CRC and NREL for Research Performed Under Agreement No VE–8–2"; Coordinating Research Council 1994.

Peterson, James E. and Stedman, Donald H.; "Find and Fix the Polluters"; Chemtech 1992;, pp. 47–53.

Bishop, Gary A. and Stedman Donald H.; "Infrared Emissions and Remote Sensing"; Journal of Air and Waste Management Assoc. 1992; vol. 42#5, pp. 695–697.

Bishop, Gary A., Starkey, John R., Ihlenfeldt, Anne, Williams, Walter J. and Stedman Donald H.; "IR Long–Path Photometry; A Remote Sensing Tool for Automobile Emissions"; Analytical Chemistry 1989; vol. 61#10, pp. 671A–677A.

Axelsson, Hakan, Eilard, Anders, Emanuelsson, Annika, Galle, Bo, Edner, Hans, Regnarson Par and Kloo Henrik; "Measurement of Aromatic Hydrocarbons with the DOAS Technique"; Applied Spectroscopy 1995; vol. 49#9, pp. 1254–1260.

Baum, Marc M., Kiyomiya, Eileen S., Kumar Sasi and Lappas, Anastasios M.' "Multicomponent Remote Sensing of Vehicle Exhaust by Dispersive Absorption Spectroscopy. 1. Effect of Fuel Type and Catalyst Performance"; Environmental Science and Technology 2000; pp. 34 & 2851–2858.

Stedman, Donald H. and Smith, Dennis L.; "$NO_x$ Data by Remote Sensing"; Coordinating Research Council 1995; pp. 4–47 & 4–63.

Shore, P.R. and Devries, R.S.; "On–line Hydrocarbon Speciation Using FTIR and CI–MS"; Society of Automotive Engineers 1992; SAE #922246.

Bishop, Gary A. and Stedman, Donald H.; "On–Road Carbon Monoxide Emission Measurement Comparisons for the 1988–1989 Colorado Oxy–Fuels Program"; Environmental Science & Technology 1990; pp. 24 & 843–847.

Stedman, Donald H., Bishop, Gary, Peterson, James E., and Geunther, Paul L.; "On–Road CO Remote Sensing in the Los Angeles Basin"; CA–EPA (CARB) 1991; pp. 24 & 843–847.

X–Rite Incorporated; "A Guide to Integrating Sphere Theory and Applications"; 2002; www.labsphere.com.

Geunther, Paul L., Stedman, Donald H., Bishop, Gary A., Beaton, Stuaret P., Bean, James H. and Quine Richard W., "A Hydrocarbon Detector for the Remote Sensing of Vehicle Exhaust Emissions"; Review of Scientific Instruments 1994; vol. 66(4), pp. 3024–3029.

Stephens, Robert D., Mulawa, Patricia A., Giles, Michael T., Kennedy, Kenneth G., Groblicki, Peter J. and Cadle, Steven H.; "An Experimental Evaluation of Remote Sensing–Based Hydrocarbon Measurements: A Comparison to FID Measurements"; Journal of Air and Waste Management Assoc. 1996; pp. 46 & 148–158.

Stedman, Donald H.; "Automobile Carbon Monoxide Emissions"; Environmental Science and Technology 1989; vol. 23#2, pp. 147–149.

Adachi, Masayuki, Yamagishi, Yutaka, Inoue Kaori and Ishida, Kozo; "Automotive Emissions Analyses using FTIR Spectrophotometer"; Society of Automotive Engineers 1992; SAE #920723.

Koplow, Michael D., Jimenez, Jose L., Nelson, David D., Schmidt, Stephan E.; "Characterization of On–Road Vehicle NO Emissions by Means of a TILDAS Remote Sensing Instrument"; Coordinating Research Council 1997; pp. 8–35 & 8–62.

Guenther, Frank W., Walls, John R. and Carrel, Mark W.; "Determination of Catalyst Oxidation and Reduction Efficiencies from Tailpipe Emissions Measurements"; Society of Automotive Engineers 1997; SAE #972911.

Cox, Frank W., Walls, John R. and Carrel, Mark W.; "Determination of Catalyst Oxidation and Reduction Efficiencies from Tailpipe Emissions Measurements"; Society of Automotive Engineers 1997; SAE #972911.

Lawson, Douglas R., Groblicki, Peter J., Stedman, Donald H., Bishop, Gary A. and Guenther Paul L.; "Emissions from In–Use Motor Vehicles in Los Angeles: A Pilot Study of Remote Sensing and the Inspection and Maintenance Program"; Journal of Air and Waste Management Assoc. 1990; vol. 40#8, pp. 1096–1105.

Stedman, Donald H., Bishop, Gary A. and Pitchford, Marc L.; "Evaluation of a Remote Sensor for Mobile Source CO Emissions"; University of Denver 1991; Rpt. #EPA 600/4–90/032.

McLaren, Scott E., Stedman, Donald H., Greenlaw, Pamela D., Bath, Raymond J., and Spear, Richard D.; "Comparison of an Open Path UV and FTIR Spectrometer"; Air and Waste Management Assoc. 1992; vol. 92–73.10.

Bishop, Gary A., Zhang, Yi, McLaren, Scott E., Guenther, Paul L., Beaton, James E., Stedman, Donald H., Duncan, John W., McArver, Alexander Q., Zweidinger, Roy B. and Day, Frank J.; Enhancement of Remote Sensing for Vehicle Emissions in Tunnels; Journal of Air and Waste Management 1994; vol. 44, pp. 169–175.

McLaren, Scott E. and Stedman Donald H.; "Flux Measurements Using Simultaneous Long Path Ultraviolet and Infrared Spectroscopy"; Air and Waste Management Assoc. 1990; vol. 90–86.6.

Bishop, Gary A., McLaren, Scott E., Stedman, Donald H., Pierson, William R., Zweidinger, Roy B. and Ray, William D; "Method Comparisons of Vehicle Emissions Measurements in the Fort McHenry and Tuscarora Mountain Tunnels"; Atmospheric Environment 1996; vol. 30#12, pp. 2307–2316.

McLaren, Scott; "Open Path Spectrometers for Atmospheric Monitoring"; University of Denver 1995.

Stedman, Donald H. and Bishop, Gary A.; "An Analysis of On–Road Remote Sensing as a Tool for Automobile Emissions Control"; Illinois Dept. of Energy & Natural Resources 1990; ILENR/RE–AQ–90/05.

Stedman, Donald H., Peterson, James E. and McVey, Iain F.; "On–Road Carbon Monoxide and Hydrocarbon Remote Sensing in the Chicago Area"; Illinois Dept. of Energy & Natural Resources 1991; ILENR/RE–AQ–91/14.

Lyons, Carol E. and Stedman, Donald H.; "Remote Sensing Enhanced Motor Vehicle Emissions Control for Pollution Reduction in the Chicago Metropolitan Area: Siting and Issue Analysis"; Illinois Dept. of Energy & Natural Resources 1991; ILENR/RE–AQ–91/15.

Durbin, Thomas D., Truex, Timothy J. and Norbeck, Joseph M.; "Particulate Measurements and Emissions Characterizations of Alternative Fuel Vehicle Exhaust"; National Renewable Energy Laboratory 1998; NREL/SR–540–25741; Subcont#ACI–7–16637–01.

Didomenico, John, Johnson, Jim, Webster, Jason and Rendahl, Craig S.; "Preliminary Results from Cold Start Sensor Testing"; Coordinating Research Council 1997; pp. 4–71 & 4–72.

Stephens, Robert D. and Cadle, Steven H.; "Remote Sensing Measurements of Carbon Monoxide Emissions from On–Road Vehicles"; Journal of Air and Waste Management Assoc. 1991; vol. 41#1, pp. 39–46.

Jimenez, Jose L., McRae, Gregory J., Nelson, David D., Zahniser, Mark S. and Kolb, Charles E.; "Remote Sensing of NO and $NO_2$ Emissions from Heavy–Duty Diesel Trucks Using Tunable Diode Lasers"; Environmental Science & Technology 2000; pp. 34 & 2380–2387.

Stedman, Donald H., Bishop, Gary A., Guenther, Paul L., Peterson, James E., Beaton, Stuart P. and McVey, Iain F.; "Remote Sensing of On–Road Vehicle Emissions"; University of Denver 1992; Contract #VE–8–1.

Bureau of Automotive Repair; "On Road Emissions Meaurement System (OREMS) Specifications"; OREMS Specifications–Version 0, Jan. 28, 2002; 2002 California DCA/BAR.

Jiménez–Palacios, José Luis; "Understanding and Quantifying Motor Vehicle Emissions with Vehicle Specific Power and TILDAS Remote Sensing"; Massachusetts Institute of Technology, Feb. 1999.

Singer, Brett C., Harley Robert A., Littlejohn, David, Ho, Jerry and Vo, Thu; "Scaling of Infrared Remote Sensor Hydrocarbon Measurements for Motor Vehicle Emission Inventory Calculations"; Environmental Science and Technology 1998; vol. 32#21, pp. 3241–3428.

Atkinson, Chris M., McKain, David L., Gautam, Mridul, El–Gazzar, Laila, Lyons, Donald W. and Clark, Nigel N.; Speciation of Heavy Duty Diesel Engine Exhaust Emissions; Coordinating Research Council 1995; pp. 5–71 & 5–92.

Chaney, Lucian W.; "The Remote Measurement of Traffic Generated Carbon Monoxide"; Journal of Air Pollution Control Assoc. 1983; vol. 33#3, pp. 220–222.

Todd, Michael and Barth, Michael; "The Variation of Remote Sensing Emission Measurements with Respect to Vehicle Speed and Acceleration"; Coordinating Research Council 1995; pp. 4–1 & 4–14.

Hoshizaki, H.; Wood, A.D and Kemp, D.D.; "Vehicle Inspection Instrumentation"; Lockheed Missiles & Space Company 1973; ARB–3C–235–7.

Sigsby, Jr., John E., Tejada, Silvestre and Ray, William; "Volatile Organic Compound Emissions from 46 In–Use Passenger Cars"; Environmental Science & Technology 1987; pp. 21 & 466–475.

* cited by examiner

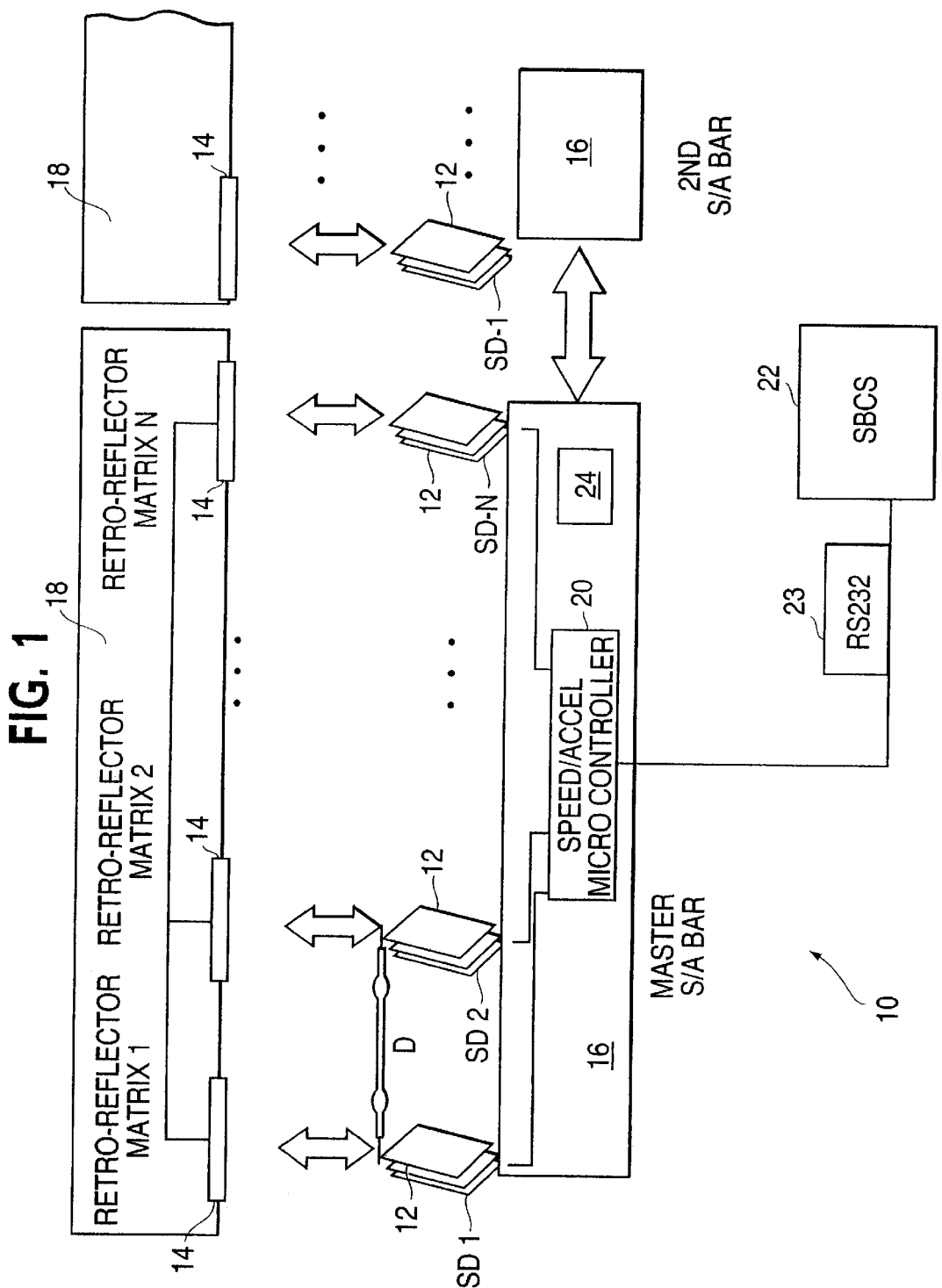

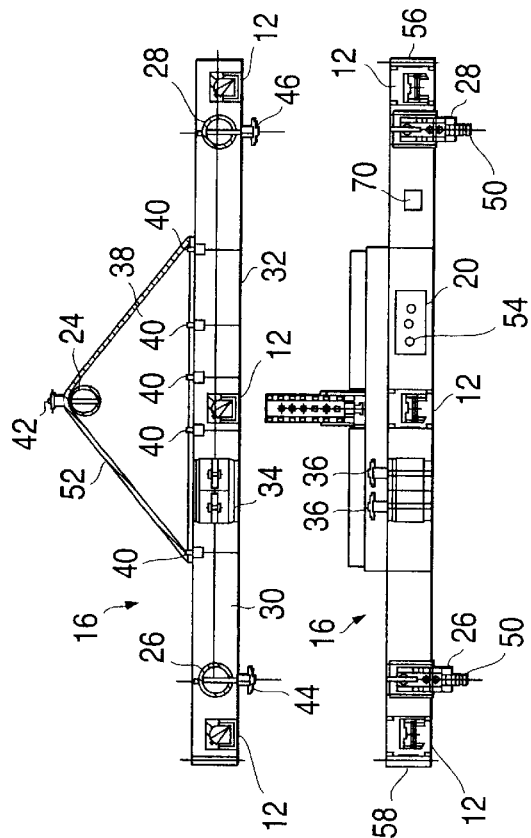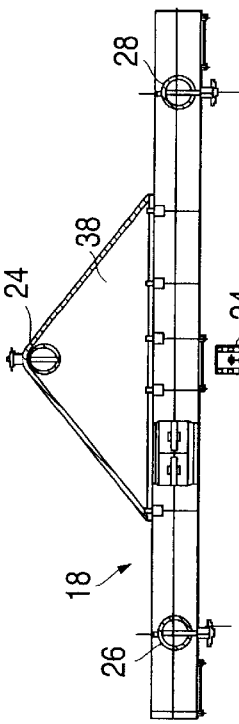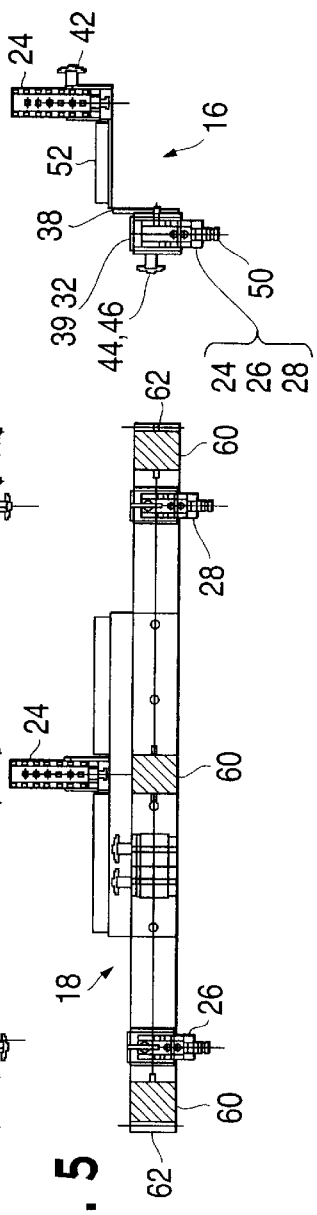

SUPPORT STRUCTURE FOR SYSTEM FOR MEASURING VEHICLE SPEED AND/OR ACCELERATION

PRIORITY

This application claims priority to provisional U.S. Patent Application Ser. No. 60/258,561, filed Dec. 29, 2000, the disclosure of which is hereby incorporated by reference.

FIELD OF THE INVENTION

The present invention relates generally to an apparatus and method for measuring the speed and/or acceleration of a vehicle. More particularly, the invention relates to the use of a projected radiation beam that is blocked by passing vehicles.

BACKGROUND OF THE INVENTION

Various arrangements for measuring the speed and/or acceleration of a vehicle moving along a surface such as a roadway have been known. One such device uses radiation sources on one side of the roadway, projecting a beam across the roadway to be received by a respective detector. The detectors are on the opposite side of the roadway from the radiation sources. The detectors detect when the beam is blocked by a wheel of the vehicle. A calculating circuit determines the speed and/or acceleration of the vehicle based on information from the detectors.

A disadvantage of this known arrangement is that the radiation sources and detectors must be placed on opposite sides of the roadway from each other. Since both the detectors and radiation sources require power to operate, this means that a separate power supply must be provided on each side of the roadway.

Another disadvantage of the known arrangement is that it is difficult to align the sources and detectors so that the beam hits the detector.

Still another disadvantage of the known arrangement is that there is no means for approximating the size and/or mass of the passing vehicle, information useful in the calculation of the Specific Power generated by the vehicle. Specific Power is crucial to correlating on-road in-use emissions from vehicles to stationary loaded-mode tests when the embodiment of this invention is applied to on-road in-use emissions testing.

No currently known embodiment of speed and acceleration can be implemented such that more than one group of sensors can connected in series ("daisy-chained") to produce multiple sets of speed and acceleration measurements.

Yet another disadvantage of known arrangements is that there is no provision for a convenient support structure that can support more than one unit such as sender units, detector units, or reflector units, to provide a fixed spacing between the units while also permitting the support to be adjustable for uneven surfaces or for mounting on a curb when desired. Also, there is no provision for making such a support able to be disassembled for storage and/or transport.

Accordingly, it would be desirable to have an arrangement where power could be supplied on only one side of the roadway and which is easier to align than conventional arrangements.

It would also be desirable to have a convenient support structure that can support more than one unit such as sender units, detector units, or reflector units, to provide a fixed spacing between the units while also permitting the support to be adjustable for uneven surfaces or for mounting on a curb when desired. Also, it would be desirable to have a provision for making such a support able to be disassembled for storage and/or transport.

SUMMARY OF THE INVENTION

In accordance with one embodiment of the present invention, an apparatus is provided for determining the speed and/or acceleration of a motor traveling on a vehicle path. The apparatus has a first radiation source arranged at a first side of the vehicle path and a first reflector arranged on a second, opposite side of the vehicle path from the radiation source that reflects the radiation from the first radiation source back towards the first side of the vehicle path. A first detector is arranged at the first side of the vehicle path that receives the reflected radiation from the first reflector and detects a presence or absence of the reflected radiation. A second radiation source is arranged at the first side of the vehicle path and a second reflector is arranged on the on the second, opposite side of the vehicle path from the second radiation source that reflects the radiation from the second radiation source back towards the first side of the vehicle path. A second detector is arranged at the first side of the vehicle path that receives the reflected radiation from the second reflector and detects a presence or absence of the reflected radiation. A controller which is operatively connected to the first and second detectors calculates at least one of the speed and acceleration of the motor vehicle in response to the detection by the first and second detectors.

The invention provides a method for measuring at least one of the speed and acceleration of a vehicle traveling on a vehicle path by emitting radiation from a first side of the vehicle path, then reflecting the radiation emitted at a second, opposite side of the vehicle path back towards the first side of the vehicle path. The reflected radiation is received at the first side of the vehicle path and a presence or absence of the reflected radiation is detected. At least one of the speed and acceleration of the motor vehicle is calculated in response to the detecting step.

In another aspect, the invention provides a support for supporting two or more units used in a system for measuring a speed and or acceleration of a vehicle, with the support able to rest on a surface, has an elongated bar on which the units are mounted. A first leg and a second leg are both mounted to the bar. A third leg is mounted to a rear portion. The legs in some embodiments are height-adjustable.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a schematic diagram of the hardware utilized in the present invention.

FIG. 2 is a top plan view of a source/detector (S/D) unit according to a preferred embodiment of the invention.

FIG. 3 is a front view of the S/D unit shown in FIG. 2.

FIG. 4 is a top plan view of a reflector unit according to the present invention.

FIG. 5 is a front view of the reflector unit shown in FIG. 4.

FIG. 6 is a side view of the S/D unit of FIG. 2 and also represents a side view of the reflector unit of FIG. 4.

DETAILED DESCRIPTION OF THE INVENTION

In general, according to the invention, two or more laser/photo-detector modules, also referred to as source/detector (S/D) units, are placed at known distances apart from each other along the vehicle path, emitting beams perpendicular to the roadway or path of travel of the vehicle, to a respective retro-reflective element located across the roadway. The beam is reflected back by the retro-reflective element and detected by the S/D unit. When a passing vehicle breaks the beam, the timing of the interruption of the beams is used to calculate an indication of speed and/or acceleration of the vehicle.

Accordingly, the present invention provides a system and method for measuring the speed and/or acceleration of a vehicle. Referring to FIG. 1, a preferred embodiment of the system 10 includes a plurality of integral source/detector ("S/D") units 12 arranged on opposite sides of the vehicle path from retro-reflector matrix units 14. The S/D units 12 each have a radiation beam output and a detector. The S/D units 12 and/or retro-reflector matrix units 14 can be positioned by being attached to bar units 16, 18 of known length to fixedly separate the distance D between the units in the direction of travel being measured. The S/D units 12 each project a radiation beam, such as a laser beam, generally perpendicularly across the roadway or path of vehicle travel toward the other side of the roadway. Each retro-reflector matrix unit 14 is positioned on the other side of the roadway and receives and reflects the beam back to the respective S/D unit 12. The S/D unit 12 receives the reflected beam.

The retro-reflector matrix units 14 can be provided by employment of commercially available reflector items. These retro-reflectors reflect at least a portion of a received light beam back in the direction from which the light beam hit the retro-reflector. Even if the beam does not hit the reflector perpendicular to the reflector, the retro-reflector matrix 14 will reflect a sufficient amount of light back towards the origin of the beam to be detected. Thus, the retro-reflector matrix units 14 will reflect a sufficient amount of a received beam back to the respective S/D unit 12 for detection. This provides a significant advantage of the invention, whereby the retro-reflector matrix 14 does not need to be aligned to be directly perpendicular with the direction of the beam. This feature greatly simplifies installation and set up of the system 10.

FIG. 1 further schematically depicts the arrangement of the S/D units 12 and the retro-reflector matrix units 14, with the S/D units 12 mounted to S/D bar units 16, and the retro-reflector matrix units 14 mounted to reflector bar units 18. The S/D bar units 16 each include at least two S/D units, S/D 1 and S/D 2, but may include any number greater than two, that is S/D N units. FIG. 1 also schematically illustrates that more than one S/D bar 16 and more than one reflector bar unit 18 may be used. Mounting the S/D units, S/D 1 and S/D 2, on S/D bar unit 16 provides a fixed distance between the S/D units that are mounted on the S/D bar unit 16. Similarly, mounting the retro-reflector units 14 on a S/D bar unit 16 provides a fixed distance between the retro-reflector units 14. The S/D bar unit 16 may also include a speed and acceleration microcontroller 20 which includes electronics that respond to the sensed interruptions of the beams.

In some embodiments, more than one S/D bar unit 16 may be used, with the bars cascaded ("daisy chained") together, and each bar having at least two S/D units 12. The S/D bar units 16 can be configured so that they can cascaded simply by connecting the end of one S/D bar unit 16 to the beginning of the next S/D bar unit 16. The reflector bars 18 can be cascaded in corresponding fashion.

As the vehicle drives through the remote sensing system 10, the vehicle's tires interact with the projected and reflected beams, and the vehicle's speed and/or acceleration can be measured based on detected blocking and/or unblocking of the beams. A single external computer system 22 receives signals from the microcontrollers 20 of each bar 16 in use via an interface such as an RS232 interface 23, and can calculate the vehicle's speed and/or acceleration. The computer system 22 can also supply power to the S/D bar unit(s) 16. In a preferred embodiment, the S/D unit(s) 16 also include a tilt sensor 24. The computer 22 can be a personal computer or a personal digital assistant or other suitable device.

The following list depicts a sequence of events for a single speed and acceleration bar with "N" S/D units:

1. The system reads road slope from the tilt sensor. A road slope with an incline (uphill) is expressed as a positive number. A road slope with a decline (downhill) is expressed as a negative number.
2. The vehicle begins by driving through a speed and acceleration system which is a single bar of "N" S/D laser and retro-reflective matrixes with "D" distance between them.
3. The vehicle's front tires blocks the $1^{st}$ laser beam that traverses the roadway.
4. The system records the $Time_{F1Bloc}$ of the block.
5. The vehicle's front tires exit the $1^{st}$ laser beam that traverses the roadway.
6. The system records the $Time_{F1Unbloc}$ of the unblock.
7. The vehicle's front tires blocks the $2^{nd}$ laser beam that traverses the roadway.
8. The system records the $Time_{F2Bloc}$ of the block.
9. The vehicles front tires exit the $2^{nd}$ laser beam that traverses the roadway.
10. The system records the $Time_{F2Unbloc}$ of the unblock.
11. The system reads relative vehicle mass from magnetometer sensor.

Vehicle type is determined from magnetic signature {e.g. small vehicle up to a semi tractor/trailer}.

12. The vehicle's rear tires block the $1^{st}$ laser beam that traverses the roadway.

13. The system records the $\text{Time}_{R1Bloc}$ of the block.
14. The vehicle's rear tires exit the $1^{st}$ laser beam that traverses the roadway.
15. The system records the $\text{Time}_{R1Unbloc}$ of the unblock.
16. The vehicle's rear tires blocks the $2^{nd}$ laser beam that traverses the roadway.
17. The system records the $\text{Time}_{R2Bloc}$ of the block.
18. The vehicle's rear tires exit the $2^{nd}$ laser beam that traverses the roadway.
19. The system records the $\text{Time}_{R2Unbloc}$ of the unblock.
20. The system calculates the Vehicle's Speed and Acceleration based on $1^{st}$ and $2^{nd}$ lasers:
    $\text{Speed}_1 = D/(\text{Time}_{F2Bloc} - \text{Time}_{F1Bloc})$
    $\text{Speed}_2 = D/(\text{Time}_{F2Unbloc} - \text{Time}_{F1Unbloc})$
    $\text{Speed}_3 = D/(\text{Time}_{R2Bloc} - \text{Time}_{R1Bloc})$
    $\text{Speed}_4 = D/(\text{Time}_{R2Unbloc} - \text{Time}_{R1Unbloc})$
    $\text{Accel}_1 = (\text{Speed}_3 - \text{Speed}_1)/(\text{Time}_{R2Bloc} - \text{Time}_{F1Bloc})$
    $\text{Accel}_2 = (\text{Speed}_4 - \text{Speed}_2)/(\text{Time}_{R2Unbloc} - \text{Time}_{F1Unbloc})$
21. The vehicle's front tires blocks the $3^{rd}$ laser beam that traverses the roadway.
22. The system records the $\text{Time}_{F3Bloc}$ of the block.
23. The vehicle's front tires exit the $3^{rd}$ laser beam that traverses the roadway.
24. The system records the $\text{Time}_{F3Unbloc}$ of the unblock.
25. The vehicle's rear tires blocks the $3^{rd}$ laser beam that traverses the roadway.
26. The system records the $\text{Time}_{R3Bloc}$ of the block.
27. The vehicles rear tires exit the $3^{rd}$ laser beam that traverses the roadway.
28. The system records the $\text{Time}_{R3Unbloc}$ of the unblock.
29. The system calculates the Vehicle's Speed and Acceleration based on $2^{nd}$ and $3^{rd}$ lasers:
    $\text{Speed}_5 = D/(\text{Time}_{F3Bloc} - \text{Time}_{F2Bloc})$
    $\text{Speed}_6 = D/(\text{Time}_{F3Unbloc} - \text{Time}_{F2Unbloc})$
    $\text{Speed}_7 = D/(\text{Time}_{R3Bloc} - \text{Time}_{R2Bloc})$
    $\text{Speed}_8 = D/(\text{Time}_{R3Unbloc} - \text{Time}_{R2Unbloc})$
    $\text{Accel}_3 = (\text{Speed}_7 - \text{Speed}_5)/(\text{Time}_{R3Bloc} - \text{Time}_{F2Bloc})$
    $\text{Accel}_4 = (\text{Speed}_8 - \text{Speed}_6)/(\text{Time}_{R3Ubloc} - \text{Time}_{F2Unbloc})$.
30. The system further calculates the Vehicle's Speed and Acceleration based on the $1^{st}$ and $3^{rd}$ lasers:
    $\text{Speed}_9 = 2*D/(\text{Time}_{F3Bloc} - \text{Time}_{F1Bloc})$
    $\text{Speed}_{10} = 2*D/(\text{Time}_{F3Unbloc} - \text{Time}_{F1Ubloc})$
    $\text{Speed}_{11} = 2*D/(\text{Time}_{R3Bloc} - \text{Time}_{R1Bloc})$
    $\text{Speed}_{12} = 2*D/(\text{Time}_{R3unbloc} - \text{Time}_{R1Unbloc})$
    $\text{Accel}_5 = (\text{Speed}_{11} - \text{Speed}_9)/(\text{Time}_{R3Unbloc} - \text{Time}_{F1Bloc})$
    $\text{Accel}_6 = (\text{Speed}_{12} - \text{Speed}_{10})/(\text{Time}_{R3Unboc} - \text{Time}_{F1Unbloc})$.
31. The vehicle's rear tire blocks the $N^{th}$ laser beam that traverses the roadway.
32. The system records the $\text{Time}_{FNBloc}$ of the block.
33. The vehicle's rear tire exit the $N^{th}$ laser beam that traverses the roadway.
34. The system records the $\text{Time}_{FNUnbloc}$ of the unblock.
35. The system finally calculates the Vehicle's Speed and Acceleration based on the $1^{st}$ and $N^{th}$ lasers:
    $\text{Speed}_{(2(n)^2-2n)-3} = (N-1)*D/(\text{Time}_{FNBloc} - \text{Time}_{F1Bloc})$
    $\text{Speed}_{(2(n)^2-2n)-2} = (N-1)*D/(\text{Time}_{FNUnbloc} - \text{Time}_{F1Unbloc})$
    $\text{Speed}_{(2(n)^2-2n)-1} = (N-1)*D/(\text{Time}_{RNBloc} - \text{Time}_{R1Bloc})$
    $\text{Speed}_{(2(n)^2-2n)} = (N-1)*D/(\text{Time}_{RNUnbloc} - \text{Time}_{R1Unbloc})$
    $\text{Accel}_{(n^2-n-1)} = (\text{Speed}_{((2(n)^2-2n)-1)} - \text{Speed}_{((2(n)^2-2n)-3)})/(\text{Time}_{RNUnbloc} - \text{Time}_{F1Bloc})$
    $\text{Accel}_{(n^2-n)} = (\text{Speed}_{(2(n)^2-2n)} - \text{Speed}_{((2(n)^2-2n)-2)})/(\text{Time}_{RNUnbloc} - \text{Time}_{F1Bloc})$.
36. The system calculates the average speed and acceleration:
    $\text{Speed}_{avg} = (\text{Speed}_1 + \text{Speed}_2 + \text{Speed}_3 \ldots = \text{Speed}_{(2(n)^2-2n)})/(2(n)^2-2n)$
    $\text{Accel}_{avg} = (\text{Accel}_1 = \text{Accel}_2 = \text{Accel}_3 \ldots = \text{Accel}_{(n^2-n)/(n^2-n)}$.
37. The system saves the vehicle's $\text{Speed}_{avg}$ and $\text{Accel}_{avg}$.
38. Vehicle specific power (SP) is calculated either using measured relative vehicle mass, or utilizing an equation that discounts the mass of the vehicle. SP can be calculated so that an on-road in-use measurement of a vehicle's emissions can be correlated to a treadmill test such as IM240 or other loaded mode treadmill test where SP can be calculated. USEPA uses a formula for calculating SP that is: 2*speed*acceleration, though this does not take into account an adjustment for acceleration, as can be done with this system, for those vehicles sampled on an inclined/declined roadway. Measured acceleration is adjusted for the effect acceleration due to gravity ($a_g$) has on the vehicle. The effect of $a_g$ (in English units) is calculated by multiplying the SINE of the road slope (measured in degrees angle relative to the horizon) by the factor 21.82. A road slope expressed in Percent Grade is multiplied directly to the 21.82 factor (e.g. 6% grade is 0.06*21.82). For an inclined (uphill) road slope, the vehicle must overcome acceleration due to gravity that works against the vehicle moving uphill. Therefore $a_g$ is added to the measured acceleration from the system, and $a_g$ is subtracted from the measured acceleration when a vehicle is traveling downhill. Both measured and adjusted acceleration can be reported by the system.

In the preferred embodiment, the number "N" of lasers is typically between two to four lasers and the distance "D" is typically between 1.44 feet (0.43 meters) to 4.0 feet (1.22 meters).

The sequence of events described above for performing calculations based on the sensed beam information represents a presently preferred embodiment. However, any other suitable calculations may be performed based on the sensed interruptions of the light beams, and also various steps such as, for example, calculation of specific power can be omitted in some embodiments if desired.

In the preferred embodiment, the S/D units 12 can be provided by an off-the-shelf system having a class 2 visible laser diode light source and an appropriate detector. However, any suitable radiation beam can be employed.

In a preferred embodiment of the invention, the projected beam is a modulated laser beam. Employing a modulated beam rather than a constant beam minimizes reflective noise, and thereby provides improved performance. The modulation is preferably fast enough to permit measurements having a desired accuracy. In a preferred embodiment, the beam can be modulated at approximately a 20 kHz rate. Higher radiation rates of over 200 kHz can also be employed.

The arrangement of the S/D units 12 on one side of the road, and retro-reflector units 14 on the other side of the road, provides many benefits. For example, power needs to be supplied only to one side of the roadway. This is particularly advantageous since the S/D units 12 in some applications are battery powered via the external computer 22 being battery powered. Of course, the S/D units 12 may also be powered by a temporary or permanent corded connection or other suitable power connection. Further, an operator can align the units and observe that proper alignment has been achieved, all from one side of the roadway. That is, the operator can first set the retro-reflector units 14 on the far side of the roadway, and then can place the S/D units 12 on the near side of the roadway, and manipulate the S/D units 12 until proper alignment is observed by observing an indication of the detection of the beam by the S/D units 12. Set up of the assembly is described in more detail below.

Referring to FIG. 2, although in some preferred embodiments the S/D units 12 are mounted on bar units 16 which maybe rigid metal bars, the S/D units 12 may also be deployed individually. Similarly, the retro-reflective units 14 may be deployed individually instead of on reflector bars 18. The S/D units 12 and/or retro-reflective matrixes 14 can be mounted in other fashions, and for example might be permanently mounted in a curb or roadway wall structure. The bar units 16 and/or 18 may be designed to be cascaded touching end to end, or may be designed to be spaced from each other by a predetermined distance.

In a preferred embodiment, the S/D bar units 16 can be adjusted to position the height of the laser beam above the vehicle path surface, such as a roadway, and also to orient the beam to be at least substantially parallel to the surface. To accomplish this, the bar units 16 may be provided with adjustable legs 27, 26, 28 that support the bar units 16, 18 as shown in FIGS. 2–6.

Turning now to FIGS. 2–6 in more detail, a preferred embodiment of a S/D bar unit 16 shown in FIGS. 2 and 3. The bar unit 16 includes a first rectangular tubular portion 30 connected in line with a second rectangular tubular segment 32. The two rectangular tubular segments 30, 32 are detachably mated together via a connecting piece 34 that slides into suitable tubes welded into at the respective ends of the segments 30 and 32. The connecting piece 34 has two holes drilled therethrough and receives removable pins 36. By virtue of this arrangement, the segments 30 and 32 can be separated for storage, and can be attached together to form a single continuous elongated bar for operation.

After the segments 30 and 32 have been attached together using the connecting unit 34 and the pins 36, a L-shaped rear plate 38 is attached to the back side of the segments 30 and 32 via attachment screws 40. The rear plate 38 may be provided with a stiffening flange 52 as shown. The rear plate 38 has a vertical housing at its rear corner for receiving an adjustable leg 27. The adjustable leg 27, as can be best seen in the side view of FIG. 6, has a number of holes drilled therethrough one inch (2.54 cm) apart and a releasable pin 42 can be inserted though the housing and a respective hole in the leg 27 in order to provide one inch (2.54 cm) height adjustment for the leg 27 relative to the rear plate 38 and bar assembly 30, 32. The bar segment 30 has a leg 26 that is similarly height adjustable by a pin 44. The bar segment 32 also has a leg 28 that is height adjustable by a pin 46.

By virtue of the releasable pins 42, 46, 48, each of the legs 27, 26 and 28 can be independently height adjusted to effect coarse adjustment. It is also possible in the preferred embodiment to effect a more fine adjustment on each leg 27, 26, and 28 by the lower portion of each leg having a threaded foot 50 that can be rotated to raise or lower the foot 50 by fine amounts relative to its respective leg 27, 26, and 28. The foot 50 is designated by the reference numeral 50 throughout, because the threaded insertion of the foot into the respective legs 27, 26 and 28 is the same for each leg.

Referring now particularly to FIG. 6, it will be appreciated that the arrangement of the legs 27, 26 and 28 permits the S/D bar 16 including the L-shaped rear portion 38 to be adjusted for use on a flat surface, or on a curbed or uneven surface. For example, in the configuration shown in FIG. 6, the rear leg 27 is in a primarily upward position so that it can rest in the top of a curb, while the front legs 26 and 28 can rest on a pavement surface below the curb. For use on a flat roadway surface, the rear leg 27 could be lowered into a fully lowered state, in which the feet of the legs 27, 26 and 28 would be generally in the same horizontal plate, and could rest on a roadway surface. The adjustment of the legs 27, 26 and 28, including both fine and coarse adjustments in the preferred embodiment, also permits the S/D bar 16 to be used on a crowned or otherwise inclined road surface, and still permit a generally horizontal beam.

Turning now again to FIGS. 2 and 3, the S/D bar 16 also includes three S/D units 12 in the location shown. The S/D units 12 are mounted in apertures in the front wall of the bar segments 30 or 32, and rest generally flush with the front surface of those segments.

The S/D bar 16 also includes the microcontroller 20 mounted internally of the bar 16 at the location shown. An indicator such as three holes having LED's 54 mounted therein is provided on the front surface of the bar unit 32. The LED's indicate when the entire arrangement including the bars 16 and 18 are in alignment as discussed in more detail below. The end 56 of the S/D bar 16 may have an attachment arrangement that corresponds to the other end 58 of the bars, so that the bars may be cascaded or daisy chained together. Connections 56 and 58 may also include connections for power and/or data transmission. When one bar is used alone, or in the case of the end bar of the daisy chained combination, the connector 56 may be connected directly to external computer 22 via a RS232 interface 23.

FIGS. 4 and 5 illustrate a preferred embodiment of the reflector bar 18. Like elements as in FIGS. 2 and 3 are indicated by like reference numerals throughout. The principal differences between the reflector bar 18 and the S/D bar 16 is that the reflector bar 18 has retro-reflector matrix elements 16 mounted in the positions shown, rather than the S/D units 12. The retro-reflector matrixes 16 are mounted substantially flush onto the front face of the segments 30 and 32. The reflector unit 18 does not require the supply of power, or any supply or transmission of data. Therefore, the end connections 62 and 64 which may be provided for cascading the reflector bars do not need to include power and/or data transmission.

In a preferred embodiment, there are three S/D units 12 on each S/D bar 16, equally spaced from each other, and there are three retro-reflector matrixes 14 on each reflector bar 18, also equally. spaced from each other. However, the number of units and their spacing may be modified as desired in other embodiments.

To set up the bars for operation, in a example of the usage of a single bar, the user first sets up the S/D bar 16 so that it is projecting a beam generally across the roadway surface. The user then crosses the vehicle path and sets up the reflector bar 18, so that it will receive and reflect the projected beams. The user can manipulate the reflector bar 18 until proper alignment has occurred, which will be indicated by the LED's 54 on the front face of the S/D bar 16.

The construction described above also permits for ready disassembly of the bars. For example, when not in use, the S/D bar 16 can be separated by pulling out the pins 36 and undoing the screws 40. The legs 27, 26 and 28 can also be removed from their respective housings. After this disassembly, the various individual components will now be: the bar portion 30, the bar portion 32, the L-shaped rear portion 38, the connector 34, and the legs 27, 26 and 28.

These various components can be arranged in a compact fashion for storage and/or transport.

In the preferred embodiment, the S/D bar 16 may include a tilt sensor 70 that can detect the degree of tilt from horizontal, along the lengthwise axis of the S/D bar 16. Signals from the tilt sensor 70 may be provided to the controller 20 for use in the adjustment of measured acceleration for the acceleration of gravity pulling with/against the vehicle being measured. Calculation of Specific Power of the measured vehicle includes the adjusting of measured acceleration for the acceleration on the vehicle due to the Earth's gravity.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus used in a system for measuring a speed and acceleration of a vehicle, the apparatus able to rest on a surface, the apparatus comprising:

at least two functional units, at least one functional unit per each side of a path the vehicle travels, each functional unit including one or more of a radiation emitting unit, a radiation detecting unit, a combined radiation emitting/detecting unit, and a reflector unit;

an elongated bar on which said units are mounted, said elongated bar having a rear portion;

a first leg and a second leg both mounted to said elongated bar that support said elongated bar on the surface; and a third leg mounted to said rear portion that supports said elongated bar on the surface.

2. An apparatus according to claim 1, wherein said first leg, said second leg, and said third leg are each height-adjustable.

3. An apparatus according to claim 2, wherein said first leg, said second leg, and said third leg are each height-adjustable independently from each other.

4. An apparatus according to claim 2, wherein at least one of said first leg, said second leg, and said third leg has a coarse height adjustment mechanism and a fine height adjustment mechanism.

5. An apparatus according to claim 4, wherein said first leg, said second leg, and said third leg each have a respective coarse height adjustment mechanism and a fine height adjustment mechanism.

6. An apparatus according to claim 4, wherein said coarse height adjustment mechanism comprises a pin insertable in holes spaced at intervals in said leg.

7. An apparatus according to claim 4, wherein said fine adjustment mechanism comprises a foot threadably mounted to said leg.

8. An apparatus according to claim 1, wherein said rear portion is a rear member, and said bar is selectively detachable from said rear member.

9. An apparatus according to claim 1, wherein said bar comprises at least two bar segments selectively detachable from each other.

10. An apparatus according to claim 8, wherein said rear member has an L-shaped profile, and said rear leg is height adjustable so that said rear leg may be set higher than said front legs to position the apparatus with the rear legs above a curb and the front legs below a curb.

11. An apparatus according to claim 1, wherein the functional units comprise three similar functional units.

12. An apparatus used in a system for measuring a speed and acceleration of a vehicle, the apparatus able to rest on a surface, the apparatus comprising:

at least two functional units, at least one functional unit per each side of a path the vehicle travels, each functional unit including one or more of a radiation emitting unit, a radiation detecting unit, a combined radiation emitting/detecting unit, and a reflector unit;

an elongated bar on which said units are mounted, said elongated bar having a rear portion; and means for adjusting a height and level of said elongated bar.

13. An apparatus according to claim 12, wherein said adjusting means comprises a first leg and a second leg both mounted to said bar that support said bar on the surface, and a third leg mounted to said rear portion that supports said bar on the surface, wherein said first leg, said second leg, and said third eg are each height-adjustable.

14. An apparatus according to claim 13, wherein said adjusting means comprises coarse height adjusting means and fine height adjusting means on each leg.

15. An apparatus according to claim 14, wherein said coarse height adjusting means comprises a pin insertable in holes spaced at intervals in each said leg.

16. An apparatus according to claim 14, wherein said fine adjusting means comprises a foot threadably mounted to each said leg.

17. An apparatus used in a system for measuring a speed and acceleration of a vehicle, the apparatus able to rest on a surface, the apparatus comprising:

at least two functional units, at least one functional unit per each side of a path the vehicle travels, each functional unit including one or more of a radiation emitting unit, a radiation detecting unit, a combined radiation emitting/detecting unit, and a reflector unit;

an elongated bar on which the units are mounted;

at least one height adjustable front leg mounted to the elongated bar to rest on the surface; and at least one height adjustable rear leg mounted to the elongated bar to rest on the surface.

18. A method for supporting a functional unit used in a system for measuring speed and or acceleration of a vehicle, the method comprising the steps of:

(a) adjusting a height of at least one front leg relative to the functional unit; and (b) adjusting a height of at least one rear leg relative to the functional unit.

19. A method according to claim 18, wherein at least one/of the steps (a) and (b) comprise the steps of:

adjusting the height via a coarse adjustment mechanism; and adjusting the height via a fine adjustment mechanism.

20. A method according to claim 19, wherein the coarse adjustment mechanism comprises a pin insertable in holes spaced at intervals in each said leg, and wherein the fine adjustment mechanism comprises a foot threadably mounted to each leg.

* * * * *